E. G. BUDD.
WIRE SPOKED WHEEL.
APPLICATION FILED JUNE 7, 1918.
1,424,554.
Patented Aug. 1, 1922.
3 SHEETS—SHEET 1.
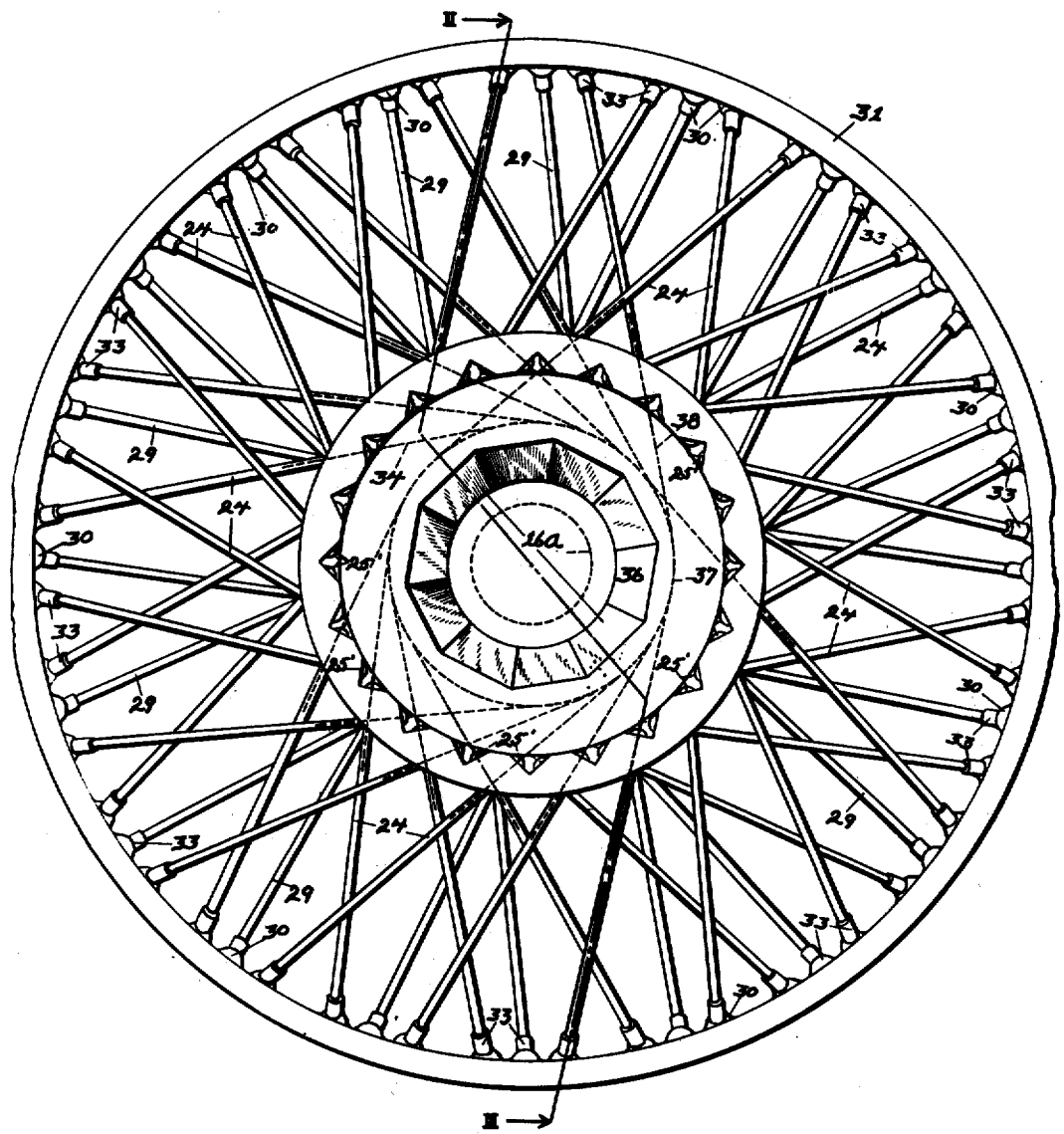
Fig. I.
Inventor
Edward G. Budd.
By Chester H Braselton
Attorney

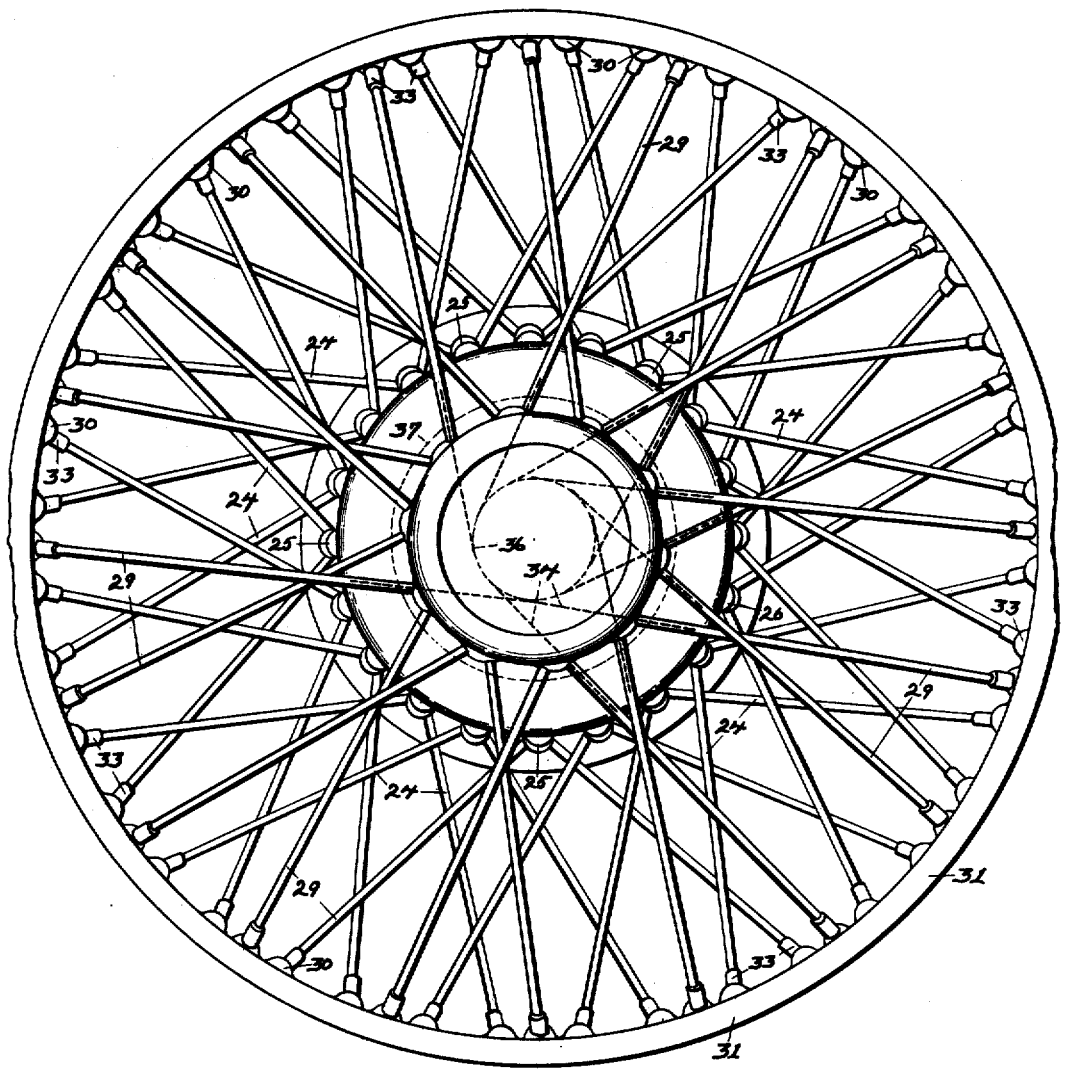
Fig. I.

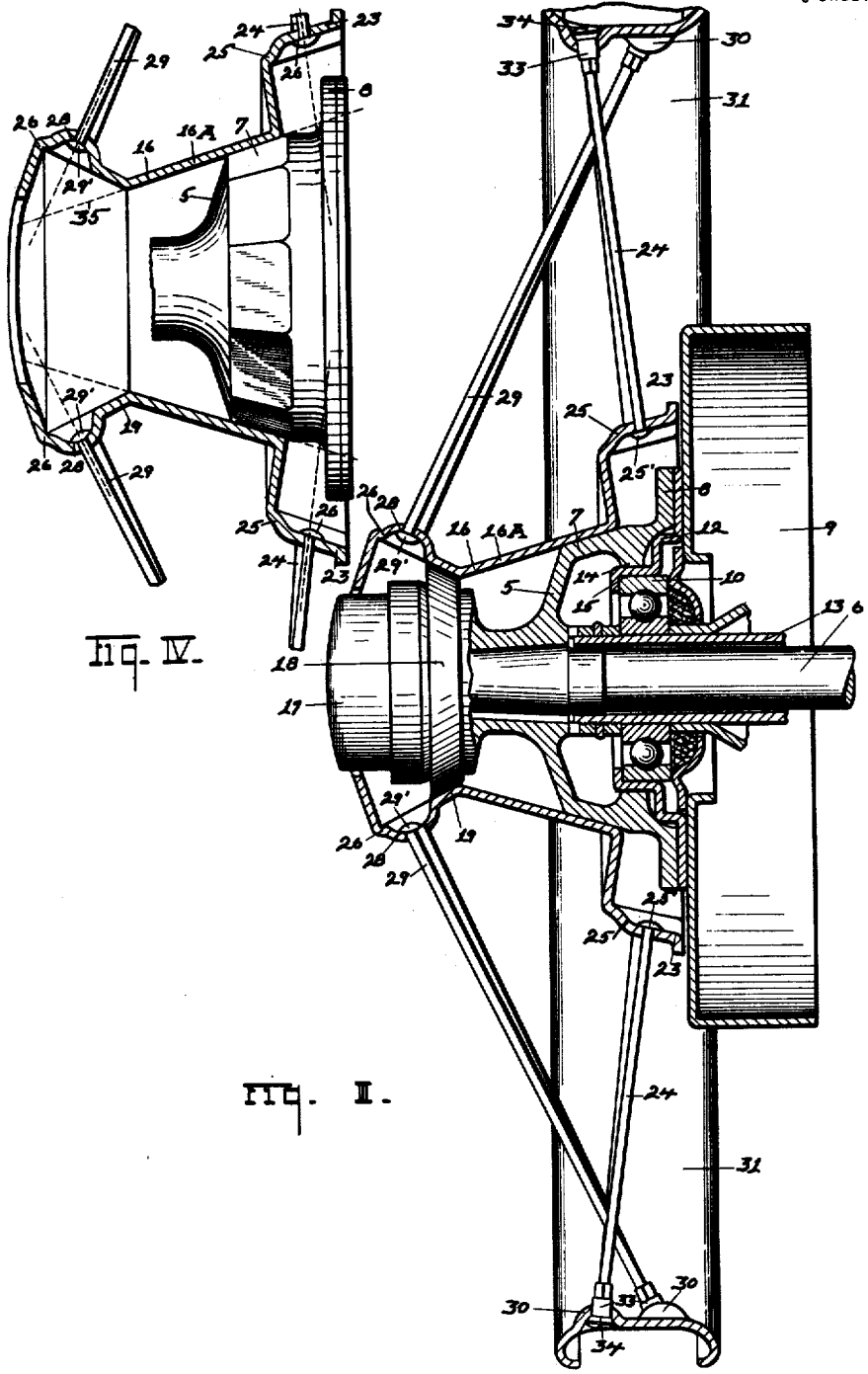

UNITED STATES PATENT OFFICE.

EDWARD G. BUDD, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

WIRE-SPOKED WHEEL.

1,424,554.  Specification of Letters Patent.  Patented Aug. 1, 1922.

Application filed June 7, 1918. Serial No. 238,704.

*To all whom it may concern:*

Be it known that I, EDWARD G. BUDD, a citizen of the United States, residing at Philadelphia, in the county of Philadelphia and State of Pennsylvania, have invented certain new and useful Improvements in Wire-Spoked Wheels, of which I declare the following to be a full, clear, and exact description.

This invention relates to wire spoked wheels and more particularly to the novel arrangement and construction of the wire spokes.

A broad object of the invention is to arrange the spokes of a wire spoked wheel so that the wheel is stronger and more efficient. The wire spokes are preferably straight throughout their length and are arranged substantially tangential to that portion of the wheel hub or a prolongation thereof which co-operates with an inner hub or other supporting means.

This application is in part a continuing application of co-pending application Ser. No. 110,112 filed by me July 19, 1916 which has matured into Patent No. 1,299,400, issued April 1st, 1919.

Further objects, and objects relating to economies of manufacture and details of construction, will definitely appear from the detailed description to follow:

I accomplish the objects of my invention by the devices and means described in the following specifications. My invention is clearly defined and pointed out in the appended claims.

A structure constituting a preferred embodiment of my invention is illustrated in the accompanying drawings, forming a part of this specification, in which:

Fig. I is an inner side elevation of the wheel embodying the invention.

Fig. II is an outer side elevation of the wheel.

Fig. III is a cross-sectional view through the wheel and the driving hub, taken substantially on line III—III of Fig. I.

Fig. IV is a detail, fragmentary view showing the wheel hub in cross-section and a portion of the driving hub in full.

Referring to the drawings, and particularly to Fig. III, the driving hub 5 is rigidly mounted on the driving axle 6 of the vehicle. The inner end of the hub 5 forms an enlarged, exteriorly inclined, pyramidal portion 7, which portion at its rear end terminates in a radial flange 8 connected in any desired manner to a brake drum 9. A ball bearing 10 is preferably interposed between a ball bearing retaining member 12 and an axle housing or casing 13 through which the axle 6 extends. The member 12 is interposed between the inner end of the hub 5 and the brake drum and the hub has an interior flange 14 seated on the angular portion 15 of the member 12.

The wheel hub 16, which is preferably formed of sheet metal, is shaped to telescope over the driving hub 5. This wheel hub is provided with a central pyramidal portion $16^A$, the faces of which co-operate with the faces of the pyramidal portion 7 of the driving hub, the two pyramidical portions being complemental and the hub 5 being adapted to drive the wheel through the same. As shown in Fig. I, there are ten faces on the portion $16^A$ of the wheel hub and of course there is an equal number of faces on the portion 7 of the driving hub 5. Any number of faces may be employed as desired but preferably a relative large number of faces is desired so that the pyramidal sections 7 and $16^A$ approximate cones. It is also obvious that any other desired form of driving connection between the driving hub and the wheel hub may be employed.

When the wheel hub is placed in position on the driving hub 5, it is detachably retained thereon by means of a cap 17 which is screwed to the outer end of the driving hub and co-operates with wedging blocks 18 which engage a conical portion 19 of the wheel hub. This form of retaining means is fully shown and described in Patent No. 1299400 which issued April 1st, 1919 on my co-pending application Serial Number 110,-112, filed July 19, 1916, and will not be described further here as reference can be had to the said patent for a more detailed description.

The inner enlarged end of the wheel hub is formed into an inclined flange 23 to which the hub ends of the spokes 24 of the inner set are secured. For the purpose of securing the spokes to the flange, the flange is provided with pressed out channels 25 which extend longitudinally of the hub 16 and have sides which are perpendicular to the length of the spokes and the ends of the spokes which project through the sides of the channels have heads 25' for anchoring the spokes therein. The outer end of the wheel hub is pressed into an angular inclined portion 26. This portion 26 has outwardly pressed semi-spherical seats 28 in which the hub ends of the spokes 29 of the outer set are anchored. These ends of the spokes project through the semi-spherical seats and have integral heads 29' for anchoring them therein. The spokes of the inner and outer set intersect each other as clearly shown in Fig. III and the outer ends of the spokes are anchored in semi-spherical depressions 30 formed in the rim 31 of the wheel. In the illustrative form disclosed in the drawings, the outer ends of the spokes are anchored in the depressions 30 by means of nipples 33 which are secured on to the threaded ends of the spokes and have semi-spherical heads 34 seated in the semi-spherical depressions 30.

The spokes of both the inner and outer sets are preferably inclined to the central plane of the wheel and they are tangentially arranged with respect to the portion 16ᴬ of the hub 16; that is to say, the spokes 24 and 29 are so arranged that if extended toward the axle in the direction of their length, they would be tangential to a conical surface in which the lines of intersection of the faces of the co-operating pyramidal portions 7 and 16 of the driven and wheel hubs, all lie. For the purpose of illustration, this conical surface is indicated in Fig. IV by the lines 35 which are extended in both directions from the portion 16 of the wheel hub to circles 36 and 37; (Figs. I and II) on the conical surface. In Figs. I and II, the dotted lines 34 indicate that the spokes of the respective sets are tangential to these circles. As the pyramidally driven section 16 is many sided, it can be seen that it approximates a cone and for all practical purposes it may be considered as being substantially conical.

From the above description, it is evident that the spokes lie in planes substantially tangential to the portion 16 of the wheel hub so that any torque which is transmitted between the hub and the rim is transmitted through the spokes only in the direction of their lengths. By this method of arrangement none of the torque is transmitted laterally to the spokes, which, of course, is very desirable, as the spokes are not as capable of sustaining a lateral torque as a longitudinal one. The spokes are also straight throughout their length and are not bent adjacent their hub ends, as is customary in the art. When the spokes are bent adjacent the wheel hub, a more or less radial connection of the spoke ends to the hub is effected, while the bodies of the spokes are inclined from the hub towards the rim and to the central plane of the wheel. This arrangement is undesirable and objectionable because of the resulting danger of the spokes becoming ruptured or broken at their bent portions, under influence of the strains to which said spokes are subjected. By mounting the hub ends of both sets of spokes in the respective pressed out portions 25 and 26, in the present construction, the spokes are straight throughout their length and therefore the above bends with their defects are eliminated.

I am aware that the particular embodiment of my invention, which I have here shown and described, is susceptible of considerable variation, and, therefore, I desire to claim the same specifically, as well as broadly, as indicated by the appended claims.

Having thus described my invention, what I claim as new and desire to secure by Letters Patent, is:

1. In combination, supporting means, a wheel comprising a metal hub having a portion seated on said supporting means, and a pressed out annular portion having pressed out channels with plane sides, and straight wire spokes projecting through the sides of the channels and arranged perpendicular to the sides of the channels and in lines substantially tangential to the hub portion seated on said supporting means.

2. In a wheel, the combination of an inner hub, an outer hub, said hubs having complemental pyramidal engaging surfaces, means for maintaining said hubs with said surfaces in engagement, a rim, and a plurality of spokes connecting said hub and rim, said spokes being tangentially disposed with reference to the cone defined by said pyramidal engaging surfaces.

3. In a wheel, the combination of an inner hub, an outer hub, said hubs having complemental pyramidal engaging surfaces, means for maintaining said hubs with said surfaces in engagement, a rim, a series of spokes connecting the outer end of said outer hub and the inner side of said rim, and a second series of spokes connecting the inner end of said hub and the outer side of said rim, the spokes of both series being tangentially disposed with references to the cone defined by said pyramidal engaging surfaces.

4. In a wheel, the combination of a hub shell having an enlarged inner end and an annular series of hemispherical spoke seats formed at the outer end of said hub shell, a rim, a series of straight spokes connecting said enlarged inner end of the hub shell and the outer side of the rim, and a second series of straight spokes anchored in said hemispherical spoke seats and connecting the outer end of the hub shell and the inner side of the rim.

5. In a wheel, the combination of a hub shell having an enlarged inner end and an annular series of hemispherical spoke seats formed at the outer end of said hub shell, and a pyramidal driving seat formed between said enlarged inner end and said spoke seats, a rim, a series of straight spokes connecting said enlarged inner end of the hub shell and the outer side of the rim, and a second series of straight spokes anchored in said hemispherical spoke seats and connecting the outer end of the hub shell and the inner side of the rim.

6. In a wheel, the combination of a hub, a rim, a series of spokes connecting the inner end of said hub to the outer side of said rim, and a second series of spokes connecting the outer end of the hub to the inner side of said rim, each series of spokes comprising spokes disposed in opposite tangential directions with respect to the hub, the spokes being so disposed with reference to the hub and the rim that each spoke of the second series is embraced by pairs of intersecting spokes of the first series.

In testimony whereof, I affix my signature.

EDWARD G. BUDD.